G. ESTERLY
Hand Fork and Rake
No { 109, 31,113, }
Patented Jan 15, 1861.
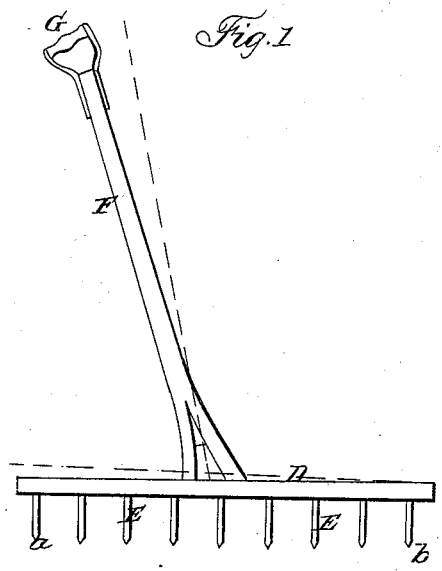
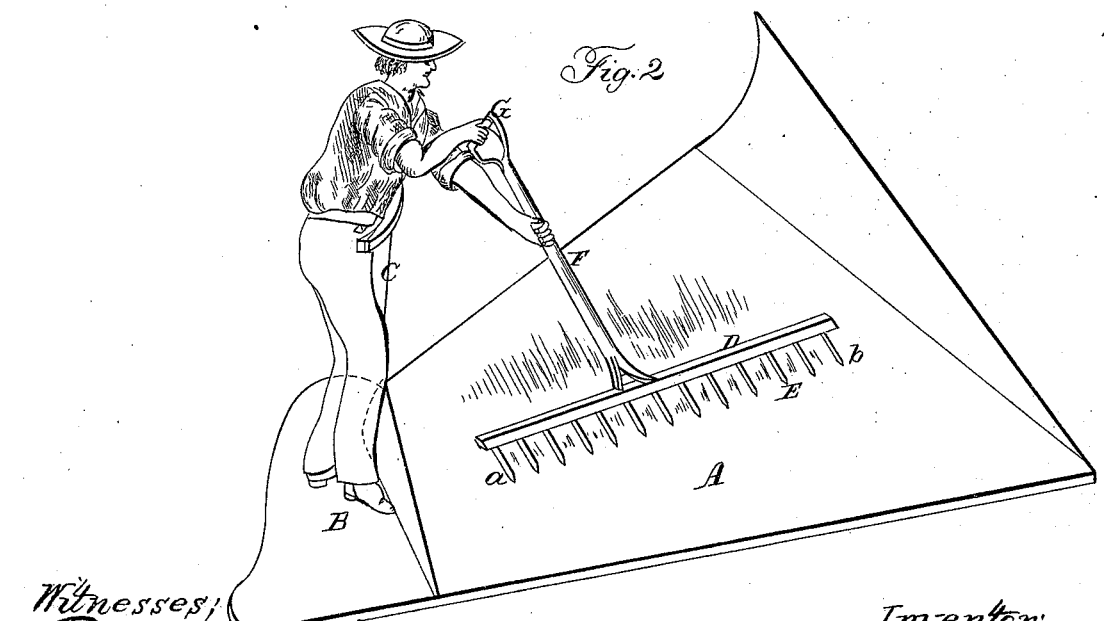

UNITED STATES PATENT OFFICE.

GEORGE ESTERLY, OF WHITEWATER, WISCONSIN.

IMPROVEMENT IN HAND-RAKES FOR REAPING-MACHINES.

Specification forming part of Letters Patent No. 31,113, dated January 15, 1861.

*To all whom it may concern:*

Be it known that I, GEORGE ESTERLY, of Whitewater, in the county of Walworth and State of Wisconsin, have invented a new and useful Improvement in Combined Hand Fork and Rake for Removing Grain from Harvester-Platforms; and I do hereby declare that the following is a full, clear, and exact description of the same, reference being had to the accompanying drawings, forming a part of this specification, in which—

Figure 1 is an elevation of my improved hand-rake. Fig. 2 is a perspective view of a platform, raker-stand, and hand-rake, illustrating the manner of use by the attendant.

Similar letters of reference in each of the several figures indicate corresponding parts.

My invention relates to certain improvements in the rake for discharging grain from the platform of the reaping-machine; and it consists in the arrangement of a handle obliquely to the stale for the purpose of adjusting the rake to use by the attendant standing inclined centrally over the platform and grain thereon. Thus located it is essential that the rake be provided with such handle as will prevent the rake-head from turning in the arc of a circle of which the stale would be the center, and also the handle must be so inclined relatively to the stale as will avoid cramping or twisting the wrist of the operator.

It also relates to a modification in the construction of the rake or fork teeth and their arrangement in relation to the rake-head, whereby the grain upon the platform, which increases in thickness toward the grain side of the platform, is compressed equally by the rake-head from end to end. This modification consists in graduating the length of the teeth, whose length corresponds with the gradually-increased thickness of the grain as it is deposited by the reel upon the platform.

To enable others skilled in the art to make and use my invention, I will proceed to describe its construction and operation.

In the drawings, a harvester-platform, A, raker-stand B, and raker-support C are shown. These, however, form no part of my present claims.

D represents the rake-head; E, the rake-teeth; F, the stale, and G the handle. The rake-teeth increase in length successively from *a* to *b*, and the object of this is to insure the raking off at each sweep of all the grain from the platform. The necessity of increasing the length of the teeth successively arises from the fact that the cut grain falls very thick upon the grain side of the platform, and gradually thins out from the grain side to the draft-frame side of the platform, and therefore the teeth require to penetrate the grain on the platform a greater distance or depth toward the grain side of the platform.

The stale F is made much shorter than usual, and stands oblique to a perpendicular, and attaches by its lower end to the upper side of the rake-head at a point nearly midway between the two ends of the rake-head. The reason why the stale is made shorter than usual is because the position of the raker-stand allows the rake to stand inclined almost directly over the grain upon the platform, and of the stale of the combined fork and rake being used in nearly a vertical position.

The handle G is made in the form of a loop, or it may be in the form of a rod or knob. It is set obliquely to the upper end of the stale. This is essential to attain the object sought. Thus setting the handle obliquely places it in a better position to enable the raker to lay hold of it without unnaturally twisting his hand or arm; also prevents the rake-head from turning, for it will be seen that the handle stands or runs nearly at right angles to that portion of the arm between the wrist and the elbow-joint.

What I claim as my invention, and desire to secure by Letters Patent, is—

1. The arrangement of the handle G obliquely to the stale F, for the purpose of adapting the rake to use by the attendant standing inclined centrally over the platform and grain thereon, substantially as set forth.

2. Graduating the length of the teeth F of the rake-head so that they correspond with the gradually-increased thickness of the grain as it is deposited upon the platform, and cause the rake-head to compress the grain equally from end to end, substantially as and for the purpose described.

GEO. ESTERLY.

Witnesses:
ROBT. W. FENWICK,
G. F. G. DIETERICH.